ID_OMITTED

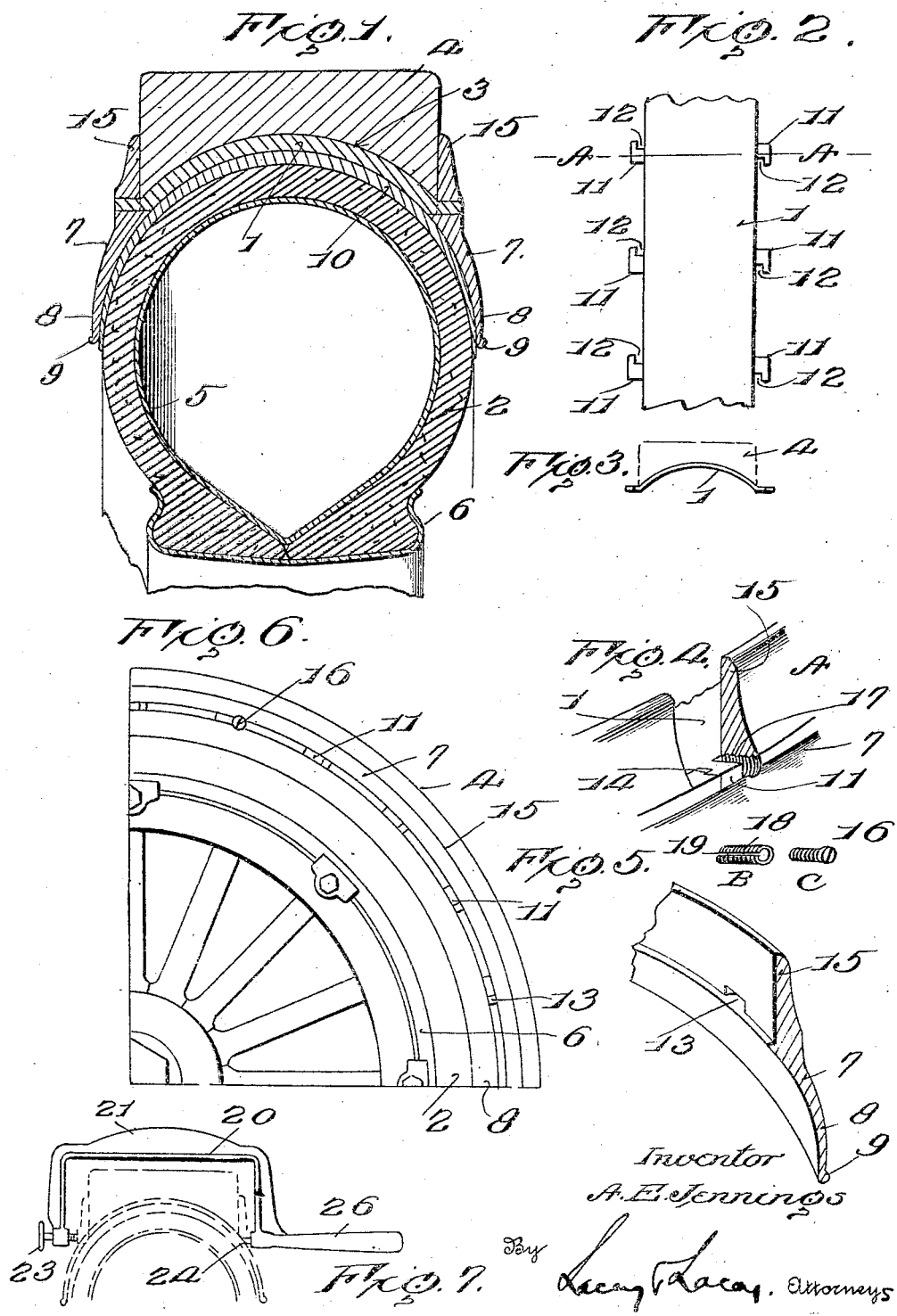

UNITED STATES PATENT OFFICE.

AARON E. JENNINGS, OF OWENSBORO, KENTUCKY.

TIRE-ARMOR.

1,304,057.  Specification of Letters Patent.  Patented May 20, 1919.

Application filed June 17, 1918. Serial No. 240,402.

*To all whom it may concern:*

Be it known that I, AARON E. JENNINGS, a citizen of the United States, residing at Owensboro, in the county of Daviess and State of Kentucky, have invented certain new and useful Improvements in Tire-Armor, of which the following is a specification.

The principal object of this invention is to improve armors for pneumatic tires, and especially the one disclosed in Letters-Patent, No. 1,255,754, granted to me February 5, 1918.

A very important object of the invention is to provide an armor that can be readily and easily placed upon the outer surface of the casing of pneumatic tires, whether old or new, for the purpose of preventing punctures and blowouts; and by the use of an additional rubber tread extending completely around the circumference of the tire, and which is connected to the metal armor shell, all wear of the casing of the pneumatic tire is eliminated. Thus one of the most important advantages is that a tire, equipped with this armor, may be used indefinitely, and when a new machine is purchased, by the use of the armor, the life of the tires will equal that of the machine.

A still further object is that the armor is so arranged that it can be manufactured to be sold at a very reasonable price. In the development of the armor, it may become necessary to make some changes in the details of construction, but without departing from the principle described.

With reference to the drawings: Figure 1 is a transverse section of the armor taken on line "A—A" of Fig. 2, and completely assembled, and plainly showing the connection with the pneumatic tire, which is also in section. Fig. 2 is a plan view of a portion of the armor shell showing the locking lugs; in this view, the part of the shell shown has been straightened in order to illustrate the lugs more clearly. Fig. 3 is a cross section of the armor shell. Fig. 4, "A" is a perspective view clearly showing the interlocking of the lugs on the armor shell and the lugs in the slots or openings of the side rings. A portion of the upper part of the side ring is cut out in order to show the interlocking of the lugs more clearly. "B" is a perspective view of the expansion sleeve. "C" is a similar view of the locking screw. Fig. 5 is also a perspective view of a portion of the side ring, as it appears from the inner side. Fig. 6 is a partial elevation of a regular type of automobile wheel equipped with demountable rim, which is mostly used, although it is immaterial to the use of the armor, whether a demountable or clencher is used. In this view it will be seen how a wheel equipped with the armor will appear from the side. Fig. 7 is a side elevation of a tool which may be employed for removing the armor from or placing the same upon a tire.

The armor consists principally of a circular concave shell which is of metal and of the thickness required, and which is designated by the numeral 1. By referring to Fig. 1, it will be seen that this shell conforms to the outside surface and shape of the casing 2 of the pneumatic tire. Vulcanized to the shell 1, at the surface indicated by number 3, is a solid continuous rubber tread 4, and while the tread is shown with a flat surface, it can be circular or molded into any shape desired. If the rubber tread 4 is pierced or penetrated through its entire thickness, the shell 1 will prevent penetration of the casing 2.

An inner tube of the ordinary type is shown at 5 in the casing 2. After having been placed upon the rim 6 in the usual way, the tire is inflated just enough to retain it in the proper shape; then the armor shell, containing the rubber tread, is forced over the outside surface of the casing 2. Two side rings 7 are provided, the lower portions 8 having the inner sides concaved so as to conform to the sides of the tread 10 of the casing 2 (see Fig. 1). It will be noted that the edges 9 of the side rings 7 are round and curved outwardly, in order to avoid a sharp contact with the tire.

The means of locking the armor shell 1 substantially to the rings 7, is as follows: Extending from and forming a part of armor shell 1 are a plurality of lugs 11, which are provided with notches 12; a similar number of slots 13 are provided where shown through the rings 7, and are spaced so as to aline perfectly with the said lugs 11 of the armor shell 1, but somewhat longer, as will be seen in Fig. 4. Notches 14, which form a part of the slots 13, are for the purpose of receiving the lugs 11, and interlocking them in the manner shown in Fig. 4. The casing, being still partially inflated, and the armor shell 1 placed thereon, one of the rings 7 is placed against the side of the tire, as in Fig. 1, so that all of the lugs 11 of this side, and being a part of the armor shell 1, pass into the slots 13 provided for same, and by turning the ring 7 to the right until tight, the ring 7 becomes interlocked with the armor shell 1. The opposite ring is placed on in a like manner, the lugs 11 of this side having the notches in opposite direction, in order that both sides will tighten in the same direction, or both rings will turn to the right to tighten. The tire is then inflated to the proper pressure against the lower part 8 of the rings 7, while the top portions of the rings 7 shown at 15 are caused to draw inward firmly against the sides of the rubber tread 4 to rigidly support and protect the same.

The pressure in the pneumatic tire holds the entire armor substantially upon same, and as the tire is used with the armor, more or less corrosion and rust will form between the joints of the lugs and slots as shown, which will cause them to become firmly united.

Screws 16 are provided, also threaded openings 17, which form a part of the slot in side ring 7 for same. In order to lock the screw 16 thoroughly, and prevent it from becoming loosened and backing out, an expander sleeve 18 is provided, the threaded opening 17 being large enough to accommodate the sleeve 18 which has similar outer threads, the inner portion having threads to correspond to the screw 16 and is tapered, and the sleeve being split as shown at 19, it will screw into the thread 17 loosely, and as the screw 16 is screwed into the sleeve 18, the inner part being tapered, the screw gradually becomes tightened, and when drawn up entirely, it is firmly locked. Two screws and threaded openings as described or more can be used.

After the rubber tread 4 is worn so that it can not be used any longer, the armor can be easily and quickly removed from the casing of the pneumatic tire, by first releasing most of the air in the tire, which will allow the rings to become loosened. They probably will require a slight jarring before entirely released. Of course the screws 16 must be removed first, then a slight turn to the left and the ring is removed. As previously stated the armor shell 1 can be thoroughly cleaned of the old rubber remaining, and a new rubber tread can be vulcanized thereon; thus the armor can be used again as before. In order that the side rings may be removed readily, I provide a tool which is shown in Fig. 7. This tool consists of a frame or clamp 20 which is reinforced externally by a rib 21 and in one end of the frame is a threaded opening to receive a thumb screw 23 while at the opposite end of the frame is a lug 24. At the latter end of the frame a handle 26 is also provided. After the screws 16 and the expanders 18 are withdrawn, the tool shown in Fig. 7 is placed over the tire and the set screw 23 turned home so as to effect a firm engagement between the frame and the side rings and these said rings may, if desired, be provided with openings or sockets to be engaged by the said set screw and the lug 24. The handle 26 is then manipulated so as to apply force to the side rings which will tend to loosen them and both side rings will be loosened and withdrawn at one operation. In assembling the armor upon the tire, the tool may be advantageously employed to maintain the rings in position until the expanders have been secured.

Having thus described my invention, what I claim as new is:

1. A tire armor comprising a metallic shell having lateral lugs on its edges, an elastic tread carried by said shell, retaining plates to bear against the tire and the tread, said plates being provided with transverse openings to receive the lugs on the shell, and locking devices fitted in some of said openings and engaging the lugs therein.

2. A tire armor comprising a metallic shell, notched lugs on said shell, an elastic tread carried by said shell, retaining plates to bear upon the tread and the tire and provided with openings to receive and engage said lugs, some of said openings having threaded walls, expansion sleeves fitted in the latter openings and engaging said threaded walls, and screws threaded into said sleeves.

In testimony whereof I affix my signature.

AARON E. JENNINGS. [L. S.]

Copies of this patent may be obtained for five cents each, by addressing the "Commissioner of Patents, Washington, D. C."